Nov. 20, 1962 E. C. SCHNEIDER, JR 3,064,315
APPARATUS FOR DECORTICATING FLAX
Original Filed Nov. 15, 1954 6 Sheets-Sheet 1

FIG.1

INVENTOR.
EDMUND C. SCHNEIDER, JR.
BY
ATTORNEYS

FIG. 3

INVENTOR.
EDMUND C. SCHNEIDER, JR.

FIG.4

INVENTOR.
EDMUND C. SCHNEIDER, JR.

Fig. 5

Nov. 20, 1962　　E. C. SCHNEIDER, JR　　3,064,315
APPARATUS FOR DECORTICATING FLAX
Original Filed Nov. 15, 1954　　6 Sheets-Sheet 6

INVENTOR.
EDMUND C. SCHNEIDER, JR.
BY
ATTORNEYS

United States Patent Office 3,064,315
Patented Nov. 20, 1962

3,064,315
APPARATUS FOR DECORTICATING FLAX
Edmund C. Schneider, Jr., Windom, Minn., assignor to Peter J. Schweitzer Division, Kimberly-Clark Corporation, Windom, Minn., a corporation of Delaware
Original application Nov. 15, 1954, Ser. No. 468,766, now Patent No. 2,983,965, dated May 16, 1961. Divided and this application July 28, 1959, Ser. No. 830,154
13 Claims. (Cl. 19—33)

This invention relates to new and useful improvements in method and apparatus for treating agricultural products and for enriching the soil and more particularly to new and useful method and apparatus for treating fibrous products, specifically flax, for the separation of tow fibers therefrom and for returning the shivey material to the soil. It is a division of my application Serial No. 468,766, filed November 15, 1954, now Patent No. 2,983,965.

Historically, while some flax plants (linum usitatissium) have been grown for fiber, the majority of flax growing has been for the production of seed (linseed).

When grown for this purpose the flax crop is usually permitted to mature in the field, is then harvested by mowing and laid in swaths or rows in the field to dry. It is then threshed to separate the seed from the straw, the seed gathered for shipment to various processing plants and the straw usually returned to the field. The straw has conventionally been considered a waste product since it is hard, dry and not readily utilizable for farm purposes (does not, for example, make good cattle bedding). Consequently, the flax straw has been disposed of or burned. While in some instances, the straw has been attempted to be plowed under or returned to the field, this has been found detrimental because of the presence of the tow fiber, in the straw.

When flax plants have been grown for the production of fibers for fine papers such as cigarette papers it is likewise conventional to mow the flax and thresh it to remove the seed. The straw is then baled and transported to a stationary decorticating plant in which the tow fiber (the vascular bundles which surround the woody inside shive) is decorticated and separated from the unwanted shives, the shives are disposed of and the tow is baled and transported to paper making machines, usually contained in a plant at a distance from the decorticating plant.

In recent years, the flax straw remaining from flax grown for the production of seed has likewise been so used. However, problems have remained unsolved. When the flax plant is grown for seed and the straw is not used for the making of papers, the disposal or burning of the straw presents an economic and labor problem, and at the same time, valuable shivey material which is of benefit for enriching the soil is destroyed. To plow the straw under when it is allowed to remain in the field is undesirable because of the presence of the tow fiber in the straw.

When the straw is used in the manufacturing of cigarette or other fine papers, it is cumbersome and uneconomical to bale the straw and to transport the straw to the decorticating plant, rupture the bales, decorticate, separate the tow from the shivey material, and dispose of the shivey material. In this instance, likewise, beneficial shivey material is being forever removed from the soil.

Furthermore, in the production of tow from straw, the straw is usually subjected to a series of mechanical manipulations which serve to free the tow or bast fibers from the shive and to effect a substantial separation of the shivey material from the straw. These treatments usually comprise a combination of breaking and scutching. The breaking consists of a mechanical manipulation of the straw during which the tow, outer husk or bark, is loosened and separated from the shivey or woody core material. This is usually accomplished by passing the straw between various cooperating mechanisms such as opposed corrugated rollers which work the straw and tend to break up the shivey material. The scutching consists of a mechanical scraping action usually accomplished by rollers rotating at different speeds.

In such mechanical manipulation, it has heretofore been important to bring or keep the straw in parallelism. However, with my invention, this disadvantage is not present and the tow may be mechanically liberated from the shive as the straw is in random condition and it is not necessary that the straw be kept in line fiber relation. In other words, in my invention the straw may be mechanically worked while at random orientation. Other disadvantages of the prior mechanical manipulation have been the excessive amount of machinery necessary for separate decortication and separation, and the poor recovery of the fiber. My inveniton provides simultaneous decortication and separation and an improved fiber recovery.

In my invention, impingement is used as contrasted with breaking or scutching, the random oriented flax straw is introduced into a zone of high velocity impingement, decorticated, air separated and an improved tow product results.

It is therefore an object of my invention to provide new and useful improvements in a method of treating flax straw or the like for the removal of tow therefrom and for enrichment of the soil.

It is a further object of this invention to provide a new and useful method of decorticating straw for separating tow from shive.

It is still a further object of this invention to provide a new and useful method of separating tow from shive in which high velocity impingement of the straw is provided while the straw is at random orientation.

It is still a further object of this invention to provide a new and useful apparatus for decorticating straw and separating tow from shive.

Other and further objects of this invention reside in the structural details of my mechanism for removing tow from shive and in the cooperation of the parts thereof.

Still other objects of this invention reside in the specific manipulative steps in my method of treating straw and enriching the soil and in my method of separating tow from shive.

Other and further objects of this invention are inherent in the method and apparatus as described, illustrated and claimed as will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

This invention will be described with reference to the drawings in which corresponding numerals refer to the same parts and in which.

Broadly stated, my invention comprises a new process for removing tow from shive and for enriching the soil by the addition of the shivey material; and an apparatus for more efficiently removing tow from shive.

In the production of flax, the plants are planted in a field, allowed to mature, and then mowed. The flax is usually cut and laid in swaths or windrows after which it is harvested and threshed, usually by combining. A power driven or self-propelled combine collects the swaths or windrows, separates the seeds from the straw, deposits the seed in a suitable container and discards the straw in a stream unto the field stubble.

The separation of the seed from the straw is usually accomplished by a mechanical rubbing action upon the grain as it passes between a rotary cylindrical member and a concave member surrounding at least a portion of the cylinder and spaced slightly apart from it. These separators are of two conventional types, one being the rubber or rasp bar type and the other the spiked tooth type. The rubber or rasp bars may be of metal or rubber and are usually positioned in a general longitudinal extension on the outside perimeter of the cylinder. The cooperating concaves are likewise of rubber or metal.

The spiked tooth separator consists of a cylinder having teeth projecting radially outwardly and concaves having spiked teeth projecting radially inwardly to intermesh with the teeth on the cylinder. Because of the nature of the manipulation of the spiked tooth separator, the straw is subject to a pulling or tearing action and the straw is therefore usually broken and chopped up. This straw from flax threshed with a spiked tooth type of separator is generally not as usable as straw separated by the rasp bar type. The straw is not only broken and chopped into smaller particles but it is more difficult to gather from the stubble for further operations and more likely to become wet and soggy. The straw from the rubber rasp bar combine is more unbroken and lies on the stubble in more fluffy windrows and is easier to further manipulate.

In accordance with the preferred embodiment of this invention the straw is then gathered from the stubble by a self-propelled or power driven machine, conveyed into communication with my new and useful decorticating unit, simultaneously decorticated, separated into tow and shive particles of predetermined size, the shive particles returned to the soil and the tow compressed and baled, for shipment to the paper making plant.

If desired, but less preferable, the straw may be collected and transported to a stationary decorticating machine where its is manipulated in accordance with the specific steps of my manipulative process.

In either instance, however, the straw fibers are injected into a decorticating unit in random orientation or helter-skelter relationship. Line orientation in my decorticator is not important as it is in the breaking or scutching machines of the prior art. The straw is then subjected to high velocity striking or impingement from the plurality of blunt hammers while it is supported in an air stream. This causes the brittle shives to be bruised, beaten and shattered. The outer tow fibers are stronger and less brittle, but are broken to some degree. The straw progresses axially and helically through my decorticator in an air stream and separation of the lighter tow is accomplished at this time while it remains airborne while the heavier shives are driven through a screen confine and ejected from my decorticator.

Figure 1:
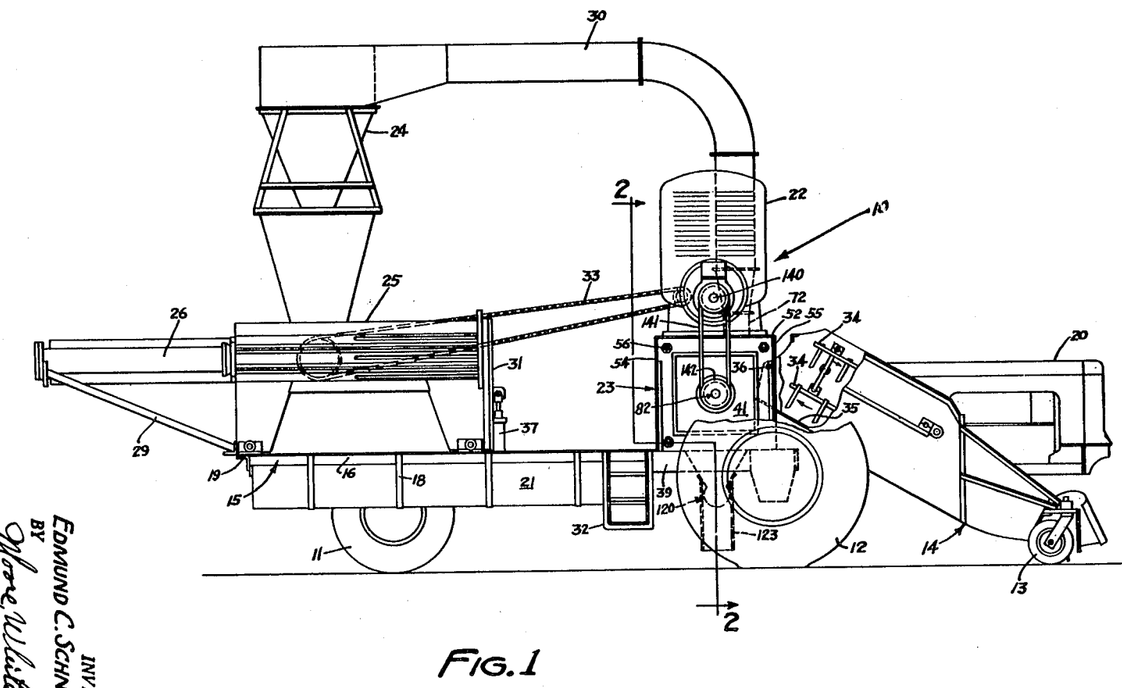
FIGURE 1 is a side elevational view of an illustrative embodiment of the apparatus of my invention.

By reference to the drawings and specifically to FIGURE 1, there is shown the apparatus of my invention comprising a power driven decorticating vehicle or machine generally designated 10. This apparatus is supported upon three pairs of wheels 11, 12 and 13 of which wheels 11 are usually at the rear, more closely set together and steerable, wheels 12 are larger and provide the major support for the apparatus and wheels 13 are ground engaging guide or supporting wheels for a header, generally designated 14.

The wheels are supported from a suitable supporting frame 15 comprising longitudinal members as at 16, vertical members as 18 and transverse members as 19.

A motor 20 is provided for propelling the vehicle for which there is provided a gasoline supply tank 21 which also supplies a second motor 22 for running the various drives to the header 14, the decorticating unit 23, the cyclone separator 24, the baler 25, and a hydraulic pump, not shown.

The baler 25 is supported upon the frame 15 and is provided with a cylinder 26 supported by bracing 29. The cylinder 26 is provided with a suitable piston connected to a pressing head not shown. Likewise positioned on the frame is a separator 24 affixed so as to deliver tow from which the air has been separated to the baler. A conduit 30 is connected to the decorticator 23 and serves to deliver tow commingled with a blast of air to the separator 24 from whence the air is removed, the tow is then injected into baler 25, the operation of the piston of cylinder 26 through its appropriate presser head will compress the bale whereupon it is bound and removed through a gate 31, controlled by a hydraulic cylinder 37.

Since the separator 24, baler 25 and cylinder 26 form no part of this invention per se they will not be described in further detail.

As will be noted with reference to FIGURE 1, a ladder 32 is provided for affording access to the vehicle and a drive chain 33 is connected to motor 22 for driving a feeding mechanism, not shown, for transferring tow from the separator 24 to the baler 25. Motor 22 may also drive a hydraulic pump for supplying fluid under pressure for actuation of the pistons of cylinders 26 and 37 or a separate motor drive may be used as desired.

The header 14, shown at the front of the vehicle 10, is usually conventional, and is provided with a plurality of rake bars 34 which are driven by motor 20 and which rotate in the direction of the arrows shown and serve to progress the straw collected by the header over its pan 35 and into the decorticator 23. The header is in this instance pivoted at 36 to the decorticator 23 so that it may be pressed into engagement with the supporting field as shown in FIGURE 1, or be elevated into disengagement therewith for the transportation of the vehicle. The header likewise will not be explained in detail since it forms no part of the invention per se.

Figure 4:
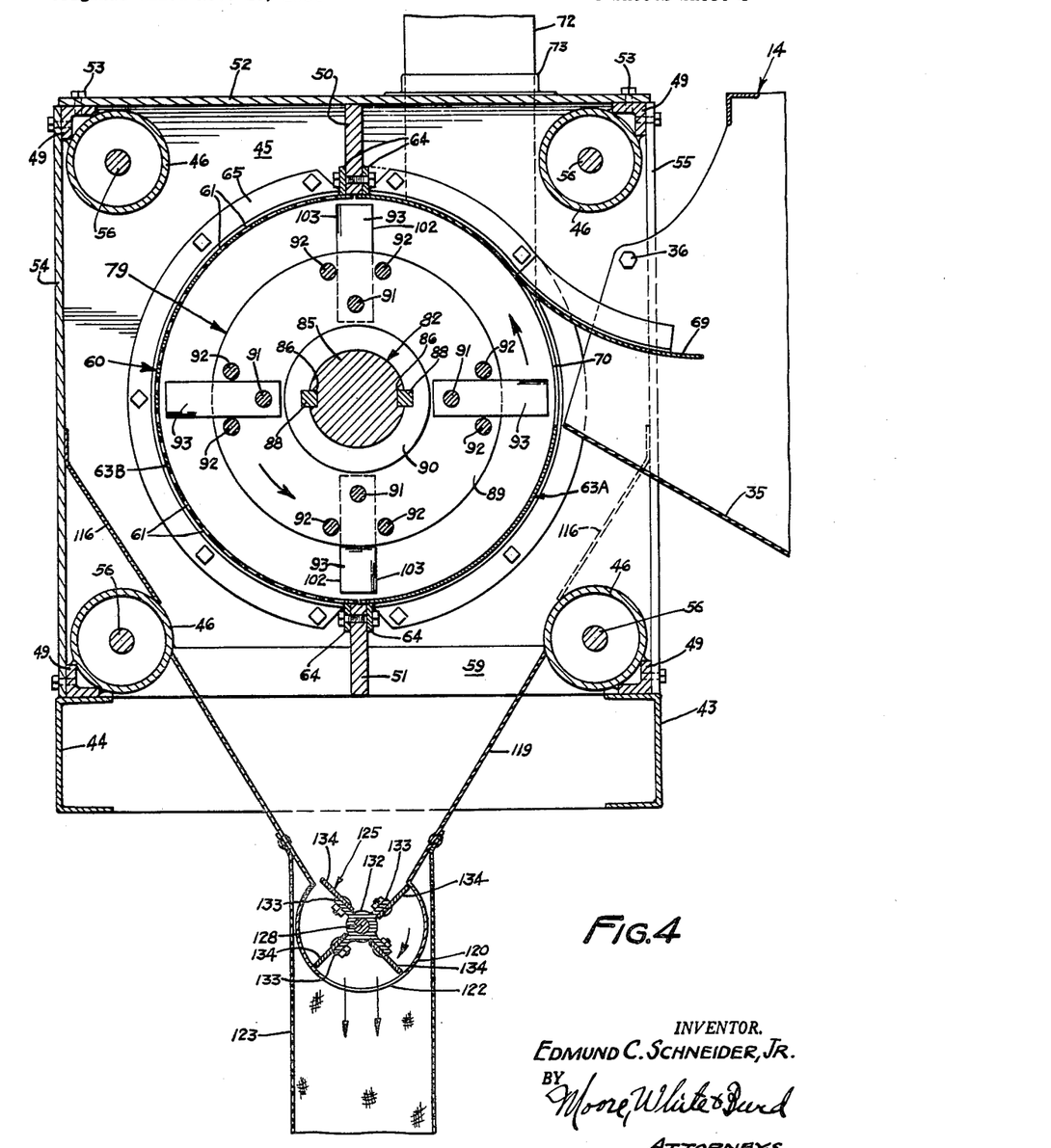
FIGURE 4 is an enlarged vertical sectional view taken along the line and in the direction of the arrows 4—4 of FIGURE 3.

My decorticating unit 23 is shown in greater detail in the remaining figures. Thus, with reference to FIGURE 2, the decorticator is shown supported upon a pair of longitudinally extending channel members 39 and 40, channel members 39 being provided with gusset plates 47 joined to the decorticator 23. The decorticator is provided with a pair of end plates 41 and 42 shown best in FIGURE 2 and gussets 47 are secured to end plate 41. The end plates rest upon the channel members 39 and 40 as shown. A second pair of channel members 43 and 44 extend between channel members 39 and 40 as shown in FIGURE 4 and complete a frame support for decorticator 23. A center plate 45 is welded or otherwise secured to four cylindrical stiffening sections 46 which extend between plates 41 and 42 and are positioned one at each corner of center plate 45 as shown in FIGURE 4. In addition, each of the stiffening sections 46 throughout its length is joined to both flanges of an angle brace 49. Plate 45 is in addition joined to a top web 50 and a bottom web 51 likewise extending the width of the decorticator 23 between end plates 41 and 42.

As shown in FIGURE 4, the decorticator 23 is substantially rectangular in cross-section, is provided with a housing comprising a top 52 secured by bolts 53 to angle members 49. A side plate 54 and a second side plate 55 are likewise joined to angle members 49 by bolts 53 all as shown in FIGURE 4. The end plates 41 and 42 are maintained in position in respect to cylindrical sections 46 by elongated bolts 56 pressed through the cylindrical sections and serving to position the end plates in abutment thereagainst.

Figure 2:
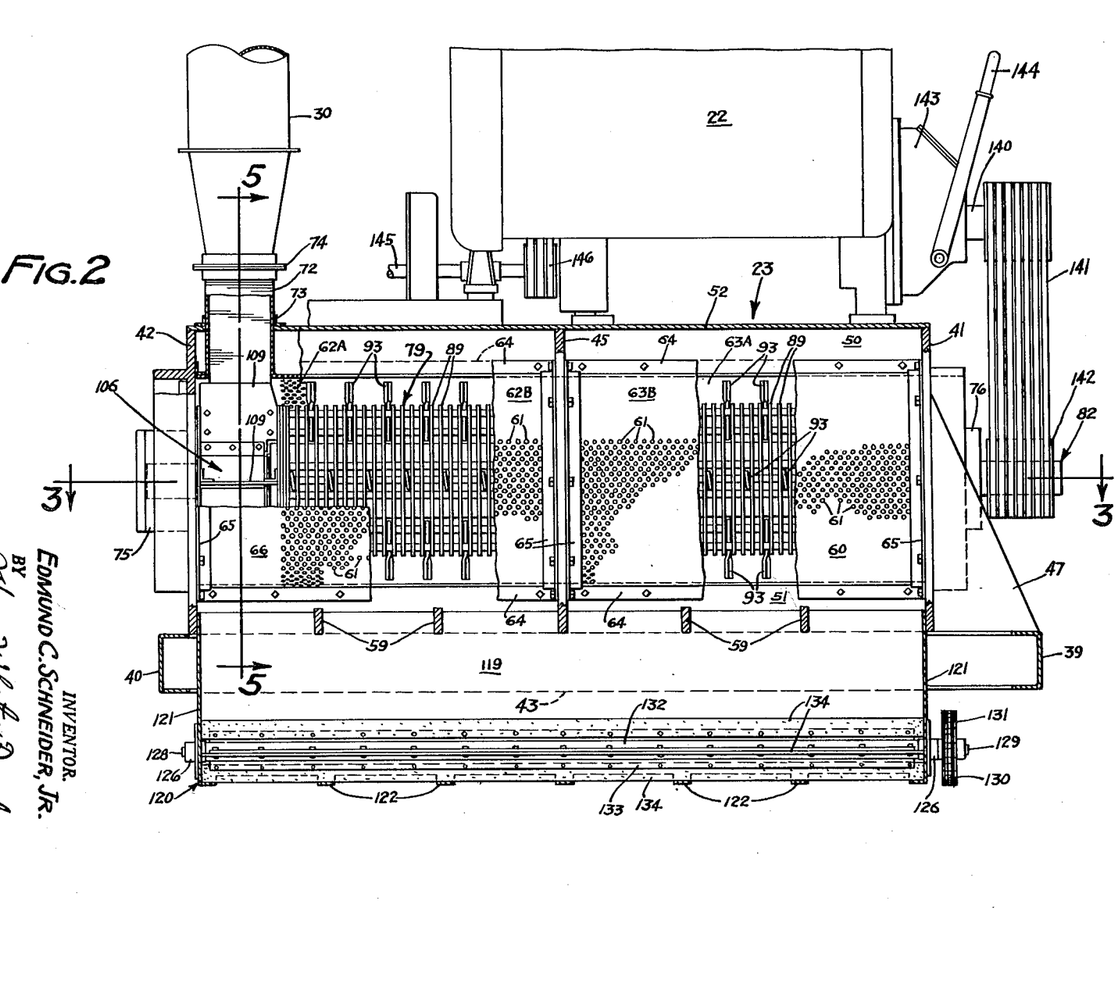
FIGURE 2 is a vertical sectional view, partially broken away, and taken in the direction of the arrows 2—2 of FIGURE 1 to show the details of the decortication apparatus of FIGURE 1.

A plurality of transverse webs 59, spaced as shown in FIGURE 2, extend between and are connected to the bottom longitudinal web 51 and the two bottom cylindrical sections 46. The center plate 45 is positioned between two of the webs 59 and has a bottom edge terminating in substantially the same plane as the bottom terminating edges of webs 59.

A screen concave generally designated 60 and having a plurality of interstices 61 throughout at least a portion of its axial extension is positioned within the decorticator 23 as shown in FIGURE 2. For illustration, in FIGURE 2, the interstices 61 have been shown as occupying only a portion of the periphery of the screen concave but this is merely for convenience in illustration and the interstices are in practice positioned throughout the peripheral extension thereof. Likewise, while the interstices 61 are shown as round holes, other shapes may be utilized all within the spirit and scope of this invention. Thus, the concave 60 comprises cooperating pairs of arcuate members 62A and 62B and 63A and 63B. Each arcuate member is provided with longitudinal flanges 64 which are secured by bolts or otherwise attached to webs 50 and 51. Each of the arcuate members is also provided with a pair of arcuate flanges 65 secured to its respective end plate 41 or 42 and center plate 45.

The arcuate member 63B is unbroken throughout its extension and is provided with interstices or a reticulated surface between its bounding flanges 64 and 65. Member 62B is likewise uninterrupted throughout its extension but is provided with interstices 61 throughout only the major portion of its surface, leaving a closed portion 66 adjacent end plate 42 of a constant axial dimension extending throughout the arcuate extension thereof for the purposes later to be explained.

Figure 3:
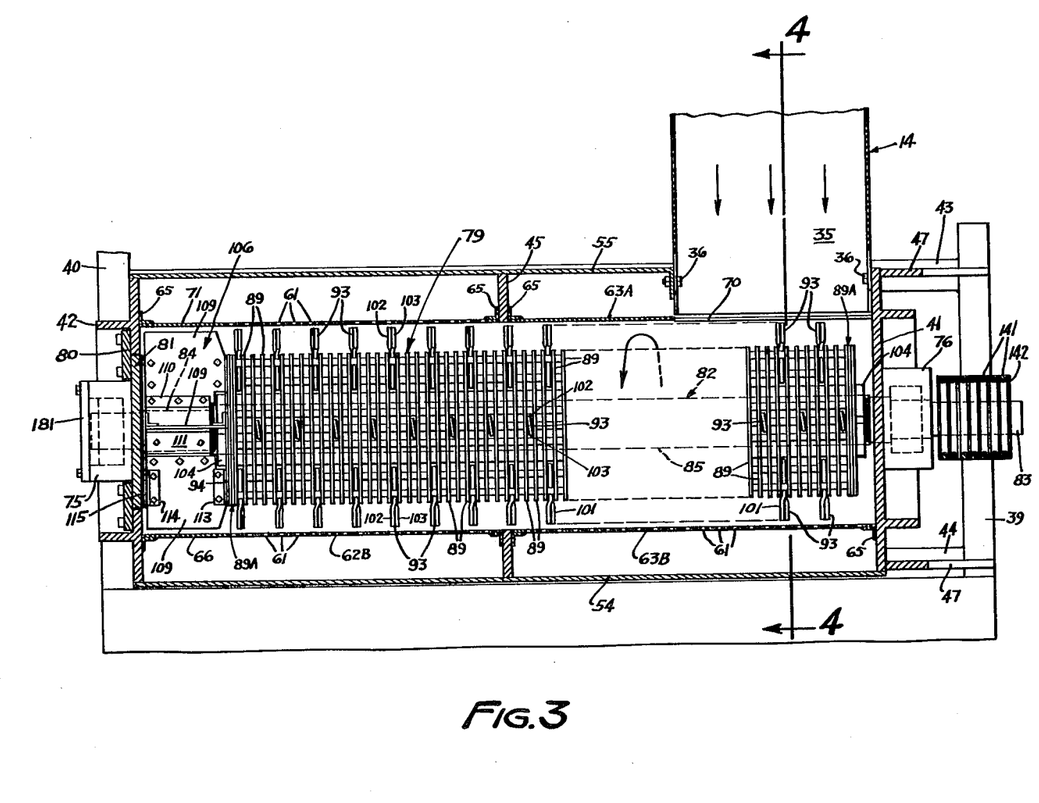
FIGURE 3 is a horizontal sectional view taken along the line and in the direction of the arrows 3—3 of FIGURE 2.

Member 63A is provided with a portion 69 of its reticulated surface severed and pulled away so as to provide a substantially rectangular aperture 70 having a vertical dimension as shown in FIGURE 4 and a horizontal dimension as shown in FIGURE 3. This permits the ingress of material into the concave 60 and portion 69 serves as a guide or hood for guiding the material thereinto as will be more fully explained subsequently. As is seen with reference to FIGURE 3, the aperture 70 and hood 69 are provided at one end of the decorticator 23 and adjacent end plate 41.

Figure 5:
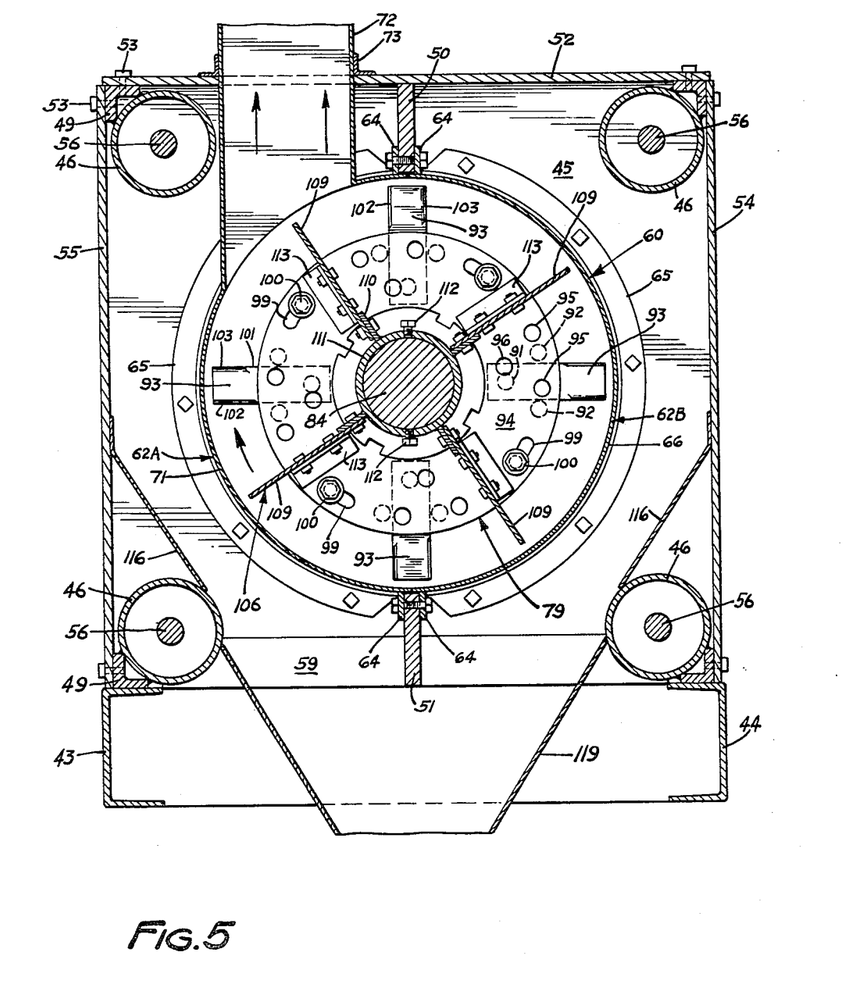
FIGURE 5 is an enlarged sectional view taken along the line and in the direction of the arrows 5—5 of FIGURE 2.

Member 62A is likewise provided with a closed portion 71 similar to closed portion 66. This portion is, however, provided with an aperture at the top thereof adjacent web 50 and end plate 42 as shown in FIGURES 2 and 5, to which is appended a rectangular cylindrical conduit section 72 forming an exit from the concave 60 which is positioned on top plate 52 by a collar 73 and joined to the conduit 30 by a union 74. The conduit 72 thus provides an exit from the concave 60 adjacent end plate 42 and thus at the opposite end of the decorticator 23 from the entrance formed by aperture 70 and header 14 which are adjacent end plate 41. The exit 72 is located in the closed portion of the concave 60 positioned adjacent the plate 42 formed by cooperating portions 66 and 71 of arcuate sections 62A and 62B.

Journalled for rotation in bearings 75 and 76 on end plates 42 and 41 respectively, is a rotor generally designated 79. As will be seen with reference to FIGURE 3, bearing 75 is separable from end plate 42 and maintained in position with respect thereto by an annular keeper 80 bolted to end plate 42 and flange 81 of bearing 75. Bearing 75 is also provided with a removable end plate 81. However, bearing 76 is provided as a part of end plate 41.

The rotor 79 comprises a shaft 82 having end portions 83 and 84 of reduced diameter and a center portion of enlarged diameter 85 provided with a pair of opposed axial keyways 86 adapted to receive keys 88. Keys 88 serve to key to the enlarged portion 85 a plurality of rotor plates 89, adjoining plates being separated by spacing disks 90 with the exception of a small number of grouped plates 89A at each end of the enlarged portion 85, which are in abutment with each other without intervening spacing disks 90. Each of the rotor plates 89 and 89A, as shown in FIGURE 4, is provided with a plurality of groups of triangularly positioned apertures, in this instance four groups, and positioned to divide the plates into four equal quadrants. The apertures are so positioned as to provide four apertures concentrically positioned around shaft 82 in which elongated rods 91 are positioned and a pair of apertures disposed outwardly with respect to the apertures in which rods 91 are positioned so as to provide cooperating apertures in which rods 92 are positioned. Thus, rods 91 serve to carry hammers 93 and rods 92 serve to provide limit stops permitting only slight arcuate pivotal movement of hammers 93 about rods 91. The rods 91 and 92 as shown in FIGURES 6 and 7 extend throughout the series of plates 89 and 89A.

An end plate 94 is provided at each end of enlarged portion 85 and in abutment with the exterior one of the grouped plates 89A. Each of the end plates as shown best in FIGURE 5 is provided with two spaced apertures 95 positioned adjacent the periphery of the end plate 94 and forming the base of a triangle and a spaced aperture 96 forming the apex of a triangle. The spaced apertures 95 and 96 are similarly positioned to the triangularly positioned apertures in which rods 91 and 92 are positioned in plates 89. Normally, as shown in FIGURE 5, the entire plate 94 is rotated slightly with reference to the exterior one of the grouped plates 89 so that the apertures 95 and 96 are displaced with reference to the ends of rods 91 and 92 as shown in FIGURE 5, thus serving to retain the rods in position. Such rotational displacement is allowed by arcuate slots 99 in which bolts 100 are positioned which are threaded into the two end members of grouped plates 89A as shown in FIGURES 5 and 7. Thus, when the end plate 94 is rotated to the position of FIGURE 5 and bolts 100 are tightened, it will be securely positioned with respect to the plates 89A and will retain rods 91 and 92 in position. However, the bolts 100 may be loosened and the end plate 94 rotated in a direction to bring apertures 95 and 96 into congruency with rods 91 and 92, thus permitting the removal of rods 91 and 92.

The hammers 93 are each provided with an offset portion 101 as shown in FIGURE 3, somewhat in the manner of an airplane propeller. Each of the offset portions is provided with a blunt or rounded leading edge 102 and a trailing edge 103. The trailing edge is displaced axially in a direction toward the exit 72 and the leading edge is displaced axially in a direction toward the entrance 70 so that as the rotor 79 rotates, the leading edge will engage the material and the incline from the leading to trailing edge will provide an axial push in the direction of the exit 72.

Figure 6:
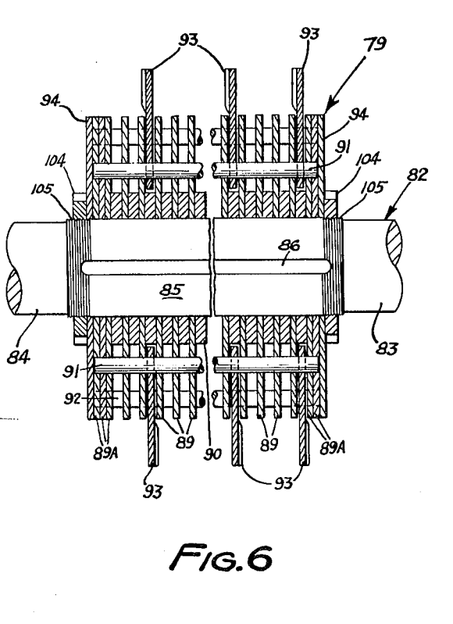
FIGURE 6 is an enlarged fragmentary vertical sectional view showing the constructional details of the rotor of my decorticating unit.
Figure 7:
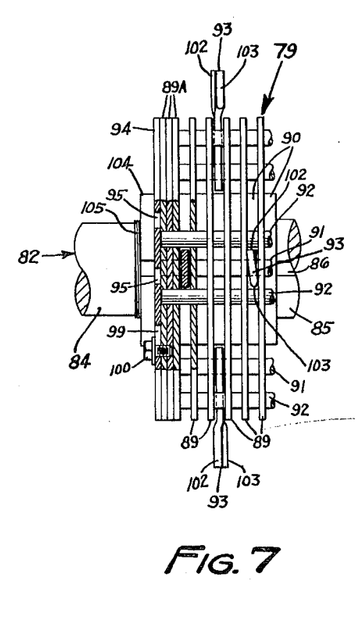
FIGURE 7 is an enlarged fragmentary elevational view partially in section and also showing details of my rotor.

As noted with reference to FIGURES 3, 6 and 7, the hammers 93 are arranged in a particular arrangement. Thus, viewing from right to left with reference to FIGURE 3, end plates 89A are provided, then two oppositely disposed hammers 93 are provided in a horizontal plane, no hammers are provided between the next two spaced plates 89 and then two opposed hammers 93 are provided in a vertical plane. Following the two opposed hammers in the vertical plane, again no hammers are provided between the next two spaced rotor plates and then two more hammers 93 are provided in a horizontal plane. Thus, in each instance, when a hammer is positioned between rotor plates 89 and on rod 91, the corresponding oppositely disposed hammer is positioned on corresponding oppositely disposed rod 91 and in the same vertical plane. Pairs of hammers positioned in vertical and horizontal planes are alternately provided on the shaft but separated by two rotor plates 89 and a spacing disk 90 from each other.

To state this another way, pairs of hammers 93 positioned in a vertical plane are each separated from one another by four rotor plates 89 and three spacing disks 90 and pairs of hammers 93 positioned in a horizontal plane are likewise so separated and the pairs of hammers positioned in a horizontal plane are further axially displaced with the pairs of hammers positioned in the vertical plane by a distance equivalent to the two rotor plates 89 and one spacer 90. It is of course to be understood that I do not limit myself to this specific arrangement and that other arrangements of hammers, plates and spacers may be made without departing from the spirit and scope of this invention. Thus, the hammers may be positioned in the same plane or staggered, or mounted spirally or in line.

The end plates 94 are retained in positioned on shaft 82 in abutment with the plates 89A by a keeper 104 threaded at 105 on the enlarged portion 85 of shaft 82. A fan 106 is positioned on shaft 82 as shown best in FIGURES 3 and 5. The fan comprises four flat blades 109 substantially rectangular and extending in the direction of the axis of shaft 82, each secured by bolts to an integral web 110 of sleeve 111 positioned on reduced end 84 by set screws 112 or otherwise secured thereto. The blades are also secured by bolts to angle brackets 113 affixed to end plate 94, at one edge, and at the other edge by bolts to similar angle brackets 114 of stiffening disk 115. Thus, the fan will rotate at the same speed as shaft 82.

By reference now to FIGURE 4, it will be seen that each one of the side plates 54 and 55 is provided with a baffle 116 extending axially the length of the decorticator and inwardly declined so as to guide material exhausted through reticulated screen 62—63 downwardly past the bottom cylindrical sections 46 and into the V-shaped chute 119 secured at its top to the bottom cylindrical sections 46, also extending axially the length of the decorticator 23 and joined to the end walls 41 and 42 thereof. The chute 119 is provided with a fragmentary cylindrical section 120 at the bottom thereof, appended thereto and likewise extending throughout the axial dimension of the decorticator. The section 120 is provided with a series of apertures, usually rectangular, at the bottom thereof separated by dividers 122, as shown best in FIGURES 2 and 4. A flexible skirt 123 is secured to the chute 119 by rivets or as desired, and serves to enclose the section 120.

Positioned in cylindrical section and journalled for rotation in end walls 121 of chute 119 is a rotary gate 125.

Gate 125 is journalled for rotation in bearings 126 positioned on walls 121 and comprises a shaft 128 having an extending end 129 provided with a sprocket 130 around which is passed a drive chain 131 by which the shaft 128 is driven from motor 20. A sleeve 132, driven by shaft 128, is provided with four flanges 133 and serves to support the four blades which are disposed at right angles to the sleeve 132. As will be apparent by reference to FIGURES 2 and 4, sleeve 132, flanges 133 and blades 134 extend the axial dimension of the decorticator and the blades 134 serve continually to close the segmental cylindrical section to the air. Thus, as material is guided by the chute 119 into segmental cylindrical section 120 and be ejected therefrom by the rotary motion of the blades 134 without the ejection of any substantial amount of air. Consequently, the decorticator is provisioned for the ejection of shives which penetrate the reticulated screen and fall into engagement with blades 134 but is substantially closed to atmosphere during such ejection.

The motor 22 is appropriately supported on top plate 52 of decorticator 23 and is provided with a take-off shaft 140 which through V-belts 141 is connected to sheaves 142 and serves to drive shaft 82 and thus the rotor of the decorticator. A clutch 143 having an engaging and disengaging lever 144 is provided for connecting take-off 140 to the motor. A second take-off 145 is provided and driven by a second plurality of V-belts 146 which through appropriate driving mechanism, not shown, is connected to a delivery means (not shown) for delivering tow from the separator 23 to the baler 24.

In use, the vehicle 10 may be traversed along a field from which the flax has been mowed, threshed and the straw returned to the field stubble. The wheels 11 and 12 serve to support the vehicle as it is traversed across the field by appropriate drive from motor 20 and the wheels 11 are steered to guide the vehicle thereacross. The wheels 13 serve to support the header 14 for collecting the straw. The windrowed straw is collected from the stubble and elevated into the header by conventional means, which may be a plurality of rotary tines and a centering auger. It is then engaged by the rack bars 34, reciprocating in the direction of the arrows shown in FIGURE 1, which by successive impulses rake the straw upwardly over the pan or floor 35 of the header 14. The straw is then raked to the rectangular aperture 70 which serves as the entrance to the decorticator 23 and guided thereinto by the guide portion or hood 69. The rotor 79 is rotated at high velocity in the direction of the arrows as shown in FIGURE 4. Since the aperture 70 also serves as an intake for the movement of air into the decorticator, the straw will be fed into engagement in the rotor in combination with an intake of air.

The rounded leading edges of the blades 93 will engage the straw which is introduced into communication therewith at random orientation and the blades will be permitted to "give" somewhat on the pivot on rod 91 and between limit rods 92. The blades 93 will thus impinge against the random oriented straw at high velocity and by virtue of their pitch or staggered relaitonship progress it leftwardly through the concave 60. As it so progresses, it travels axially and helically about the rotor 79. Consequently, during initial engagement of the straw with the blades 93 and during its axial and helical travel through the concave, it is subjected to high velocity impingement as it is supported in a stream of air which provides breaking action. The reticulated concave 60 is spaced slightly away from the ends of the blades 93, and therefore serves to confine the straw in engagement with the blades. During this impingement and breaking action, the shive, the heavier and more brittle material, is broken into fine pieces and the lighter more resilient tow is broken into longer pieces. As the bits or pieces of shive are separated from the tow, they fall downwardly and are driven through the interstices 61 and between two blades 134 which rotate at a relatively low speed and are then dropped through the flexible skirts 123 and deposited upon the ground. Since the space between two of the blades 134 is relatively filled by the shive and since at least two of the opposed blades 134 act as a closure gate to the cylindrical section 120, very little air is exhausted from the housing.

As the tow progresses through the machine it is engaged by one of the blades 109 or by the blast of air emanating therefrom or both and blown upwardly through the conduit 72 and thence through conduit 30 to the cyclone separator 24 from whence the air is separated from the tow. The tow then progresses to the baler 25 whereupon it is baled and removed through gate 31 and unloaded into a truck or other conveyance and moved to the paper mill.

In the event that my decorticator 23 is not mounted upon a vehicle the straw is collected from the field by appropriate means, baled, and then transported to the stationary decorticator and delivered into the aperture 70 by appropriate means which may be opposed conveyor belts.

Thus, there is provided a flax straw treatment in which there is accomplished a decortication or separation of the tow, outer husk or bark from the shive, and at the same time a separation and removal of the broken shive from the tow. This treatment utilizes a high velocity impingement as against conventional breaking or scutching.

In practice, I have found that it is necessary to provide an impingement speed of the blunt edges of from 6000 to 25,000 feet per minute and preferably an impingement speed of approximately 13,000 feet per minute in order to obtain satisfactory decortication and separation of the straw components. To provide such impingement speed an appropriate size rotor diameter and rotational rotor velocity are chosen.

I have also found that the impact should be delivered by a blunt edge rather than by any edge approaching a knife edge and the blunt edge should have a thickness of from 1/8 inch up to 1 1/2 inches and a radius of from 1/16 inch to 3/4 inch and preferably of 1/4 inch. I have further found that the blows should be delivered by these blunt edges to the mass of flax straw successively while the straw is supported in the stream of air and confined to proximity with these edges by an apertured screen having a plurality of openings therein throughout the major portion thereof, the openings being from 1/4 to 1 inch in diameter if circular and of substantially the same area limits if the openings are of irregular or other shape. I have also found it necessary to space the screen from 1 inch to 1/8 inch away from the exterior ends of the rotating blunt edges, these exterior ends travelling in substantially the same plane.

I have also found it preferable to position this apertured screen in a substantially air tight housing, providing an entrance at one end, an exit at the other end, and means for moving a stream of air from said entrance through the machine and thence from said exit, and to provide means for removing separated shive from the machine while maintaining such closure substantially air tight except for said entrance and said exit.

As many widely differing embodiments may be made without departing from the spirit and scope thereof, it is to be understood that I do not specifically limit myself to the embodiment disclosed herein.

What is claimed is:

1. An apparatus for decorticating and separating tow from straw comprising in combination an elongated housing, a foraminous cylindrical confine positioned in said housing, means for conveying straw into said confine positioned at one end of said housing, an elongated rotor positioned within said confine and having a plurality of blades, said blades being provided with blunt leading edges and inclined toward the direction of said entrance, the radial ends of said blades being spaced slightly from the interior surface of said confine at the exit end of said confine for rotation with said blades, a duct leading upwardly from said fan, and means positioned at the bottom of said housing for removing solid material therefrom while providing substantially an air tight closure thereof.

2. An apparatus for decorticating and separating tow from straw comprising in combination an elongated housing, a foraminous cylindrical confine positioned in said housing, means for conveying straw into said confine, a rotor positioned within said confine and having a plurality of blades, said blades being provided with blunt leading edges and the radial ends of said blades being spaced slightly from the interior surface of said confine, a fan positioned at the exit end of said confine, a duct leading from said fan, and means positioned at the bottom of said housing for removing solid material therefrom, said housing being operatively closed to air flow at all points except at said means for conveying straw into said confine and said duct leading from said fan.

3. An apparatus for decorticating and separating tow from straw comprising in combination an elongated housing, a foraminous cylindrical confine of a length more than 3 times its diameter positioned in said housing, an entrance for conveying straw into said confine and positioned at one end of said housing, an elongated rotor positioned within said confine and having a plurality of blades with blunt leading edges inclined toward said entrance, the radial ends of said blades being spaced slightly from the interior surface of said confine, a fan positioned at the exit end of said confine, a duct leading upwardly from said fan, a rotary gate positioned at the bottom side of said housing for removing solid material therefrom, said rotor comprising a plurality of disks secured to a shaft for rotation therewith, said fan likewise secured to said shaft for rotation with said disks.

4. A decorticating and separating apparatus comprising in combination an elongated housing having means providing a cylindrical confine positioned on a horizontal axis, at least the bottom portion of said cylindrical confine being foraminous, entrance means at one end of said housing for conveying straw into said confine, means within said cylindrical confine for breaking and conveying straw, fan means positioned at the exit end of said confine, a duct leading upward from said fan means, and means positioned at the bottom of said housing for removing solid material therefrom while providing substantially air tight closure thereof.

5. The apparatus for decorticating and separating tow from straw of claim 1 in which said means positioned at the bottom of said housing is a rotary gate.

6. The apparatus for decorticating and separating tow from straw of claim 3 in which said blades are arranged in opposed pairs with spacers between them.

7. The apparatus for decorticating and separating tow from straw of claim 6 in which alternate pairs of said blades are disposed at 180° with reference to each other.

8. The decorticating and separating apparatus of claim 4 in which said means positioned at the bottom of said housing is a rotary gate.

9. The decorticating apparatus of claim 1 in which said blade radial ends are spaced from said confine at least one inch.

10. The decorticating apparatus of claim 1 in which said rotor is driven at a speed to produce an average linear speed of said blades of about 15,000 feet per minute.

11. A decorticating apparatus for decorticating flax comprising: a cylindrical confine, means for introducing flax straw into said cylindrical confine, means for creating a flax straw suspending and carrying air flow through said confine, and decorticating means within said confine consisting entirely of a high speed rotor having rounded blunt edged blades that decorticates flax straw by bruising impingement, said confine being evenly spaced radially from the ends of the blades of said rotor.

12. The decorticating apparatus of claim 11 in which said blade radial ends are spaced from said cylindrical confine at least one inch.

13. The decorticating apparatus of claim 11 in which said rotor is driven at a speed to produce an average linear speed of said blades of about 15,000 feet per minute.

References Cited in the file of this patent

UNITED STATES PATENTS

| | | |
|---|---|---|
| 909,714 | Treese | Jan. 12, 1909 |
| 2,090,925 | Wilkinson et al. | Aug. 24, 1937 |
| 2,196,791 | Murray et al. | Apr. 9, 1940 |
| 2,402,634 | Kaiser | June 25, 1946 |
| 2,729,858 | Horton et al. | Jan. 10, 1956 |
| 2,812,552 | Horton et al. | Nov. 12, 1957 |
| 2,932,857 | Smith | Apr. 19, 1960 |